(12) United States Patent
Wei et al.

(10) Patent No.: US 10,186,004 B2
(45) Date of Patent: Jan. 22, 2019

(54) SYSTEM AND METHOD FOR EVALUATING A MATERIAL MOVEMENT PLAN

(71) Applicant: Caterpillar Inc., Peoria, IL (US)

(72) Inventors: Mo Wei, Dunlap, IL (US); Michael Taylor, Swissvale, PA (US); Thandava K. Edara, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 718 days.

(21) Appl. No.: 14/717,637

(22) Filed: May 20, 2015

(65) Prior Publication Data

US 2016/0343095 A1 Nov. 24, 2016

(51) Int. Cl.
*G06Q 10/00* (2012.01)
*G06Q 50/08* (2012.01)
*G06Q 10/06* (2012.01)

(52) U.S. Cl.
CPC ....... *G06Q 50/08* (2013.01); *G06Q 10/06398* (2013.01)

(58) Field of Classification Search
CPC .............................. G06Q 10/00; G06Q 30/02
USPC ................................. 705/7.11–7.42
See application file for complete search history.

(56) References Cited

U.S. PATENT DOCUMENTS

| | | | |
|---|---|---|---|
| 5,631,658 A | 5/1997 | Gudat et al. | |
| 6,076,030 A | 6/2000 | Rowe | |
| 6,167,336 A | 12/2000 | Singh et al. | |
| 6,591,145 B1 | 7/2003 | Hoskinson et al. | |
| 8,467,943 B2 | 6/2013 | Dersjö et al. | |
| 8,620,535 B2 | 12/2013 | Friend et al. | |
| 8,948,981 B2 | 2/2015 | Wei et al. | |
| 8,983,738 B2* | 3/2015 | Avitzur | E02F 9/205 701/23 |
| 2006/0149465 A1* | 7/2006 | Park | G01C 21/20 701/416 |
| 2012/0053775 A1* | 3/2012 | Nettleton | E21C 41/26 701/24 |
| 2014/0012404 A1 | 1/2014 | Taylor et al. | |
| 2014/0088838 A1* | 3/2014 | Furem | B65G 67/04 701/50 |
| 2014/0180444 A1 | 6/2014 | Edara et al. | |
| 2015/0276468 A1* | 10/2015 | Jaeger | G01G 9/00 382/154 |

* cited by examiner

*Primary Examiner* — Robert D Rines
(74) *Attorney, Agent, or Firm* — Leydig, Voit & Mayer, Ltd.

(57) ABSTRACT

A system for evaluating a target profile for moving material with a work implement along a path includes a position sensor and a controller. The controller is configured to utilize a planning system to determine the target profile, receive position signals from the position sensor, and determine from the position signals an actual profile indicative of the work surface after the work implement is moved along the path to move a volume of material. The controller is further configured to compare the target profile to the actual profile, determine at least two performance factor scores based upon a difference between the target profile and the actual profile, and generate a quantitative evaluation of the target profile based upon the at least two performance factor scores.

20 Claims, 7 Drawing Sheets

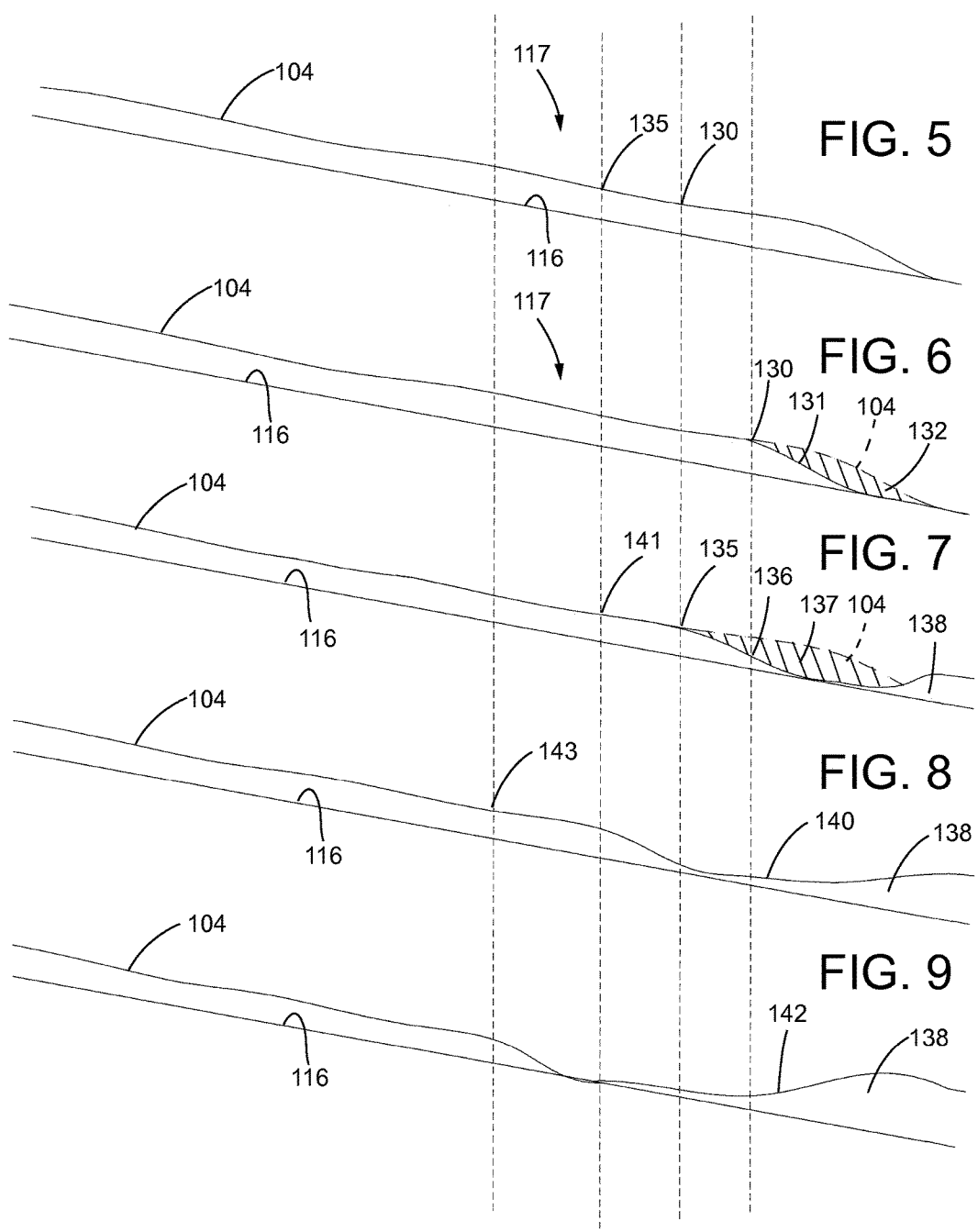

SYSTEM AND METHOD FOR EVALUATING A MATERIAL MOVEMENT PLAN

TECHNICAL FIELD

This disclosure relates generally to planning systems for material movement and, more particularly, to a system and method for quantitatively analyzing physical characteristics of a work surface and providing feedback regarding a material movement plan based upon the quantitative analysis.

BACKGROUND

Machines such as dozers, motor graders, wheel loaders, etc., are used to perform a variety of tasks. For example, these machines may be used to move material at a work site. The machines may operate in an autonomous, semi-autonomous, or manual manner to perform these tasks in response to commands generated as part of a work plan for the machines. The machines may receive instructions in accordance with the work plan to perform operations including digging, loosening, carrying, etc., different materials at the work site such as those related to mining, earthmoving and other industrial activities.

Autonomously operated machines may remain consistently productive without regard to a human operator or environmental conditions. In addition, autonomous systems may permit operation in environments that are unsuitable or undesirable for a human operator. Autonomous or semi-autonomous systems may also compensate for inexperienced human operators as well as inefficiencies associated with repetitive tasks.

The work plans may be created in view of the topography and characteristics of the material to be moved as well as the operating characteristics of the machines moving the material. It is often desirable to analyzing the efficiency or effectiveness of a work plan while or shortly after operating the machines.

U.S. Patent Publication No. 2014/0012404 discloses a system for planning a cut location at a work surface by analyzing the volume of material moved during a material moving cycle and comparing it to an expected volume of material. If the volume difference is within a threshold, the planning system may select future cut locations without modification of the system. If the volume difference is outside the threshold, the planning system may modify its operation before selecting future cut locations.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system for evaluating a target profile for moving material with a work implement along a path includes a position sensor for generating position signals indicative of a position of a work surface and a controller. The controller is configured to utilize a planning system to determine the target profile, receive position signals from the position sensor, and determine from the position signals an actual profile indicative of the work surface after the work implement is moved along the path to move a volume of material. The controller is further configured to compare the target profile to the actual profile, determine at least two performance factor scores based upon a difference between the target profile and the actual profile, and generate a quantitative evaluation of the target profile based upon the at least two performance factor scores.

In another aspect, a controller implemented method for evaluating a target profile for moving material with a work implement along a path includes utilizing a planning system to determine the target profile, receiving position signals from a position sensor, the position signals being indicative of a position of a work surface, and determining from the position signals an actual profile indicative of the work surface after the work implement is moved along the path to move a volume of material. The method further includes comparing the target profile to the actual profile, determining at least two performance factor scores based upon a difference between the target profile and the actual profile, and generating a quantitative evaluation of the target profile based upon the at least two performance factor scores.

In still another aspect, a machine includes a prime mover, a ground engaging work implement for engaging a work surface and moving a volume of material along a path, and a position sensor for generating position signals indicative of a position of the work surface. A controller is configured to utilize a planning system to determine the target profile, receive position signals from the position sensor, and determine from the position signals an actual profile indicative of the work surface after the work implement is moved along the path to move a volume of material. The controller is further configured to compare the target profile to the actual profile, determine at least two performance factor scores based upon a difference between the target profile and the actual profile, and generate a quantitative evaluation of the target profile based upon the at least two performance factor scores.

BRIEF DESCRIPTION OF THE DRAWINGS

FIG. 5 depicts a cross-section of a portion of a work site prior to a material moving cycle;

FIG. 6 depicts a cross-section of a portion of a work site similar to FIG. 5 but after a material moving cycle beginning at a first cut location;

FIG. 7 depicts a cross-section of a portion of a work site similar to FIG. 5 but after a material moving cycle beginning at an alternate cut location;

FIG. 8 depicts a cross-section of a portion of a work site similar to FIG. 7 but after a subsequent material moving cycle beginning at a subsequent cut location;

FIG. 9 depicts a cross-section of a portion of a work site similar to FIG. 8 but after still another material moving cycle beginning at a further subsequent cut location;

DETAILED DESCRIPTION

Figure 1:
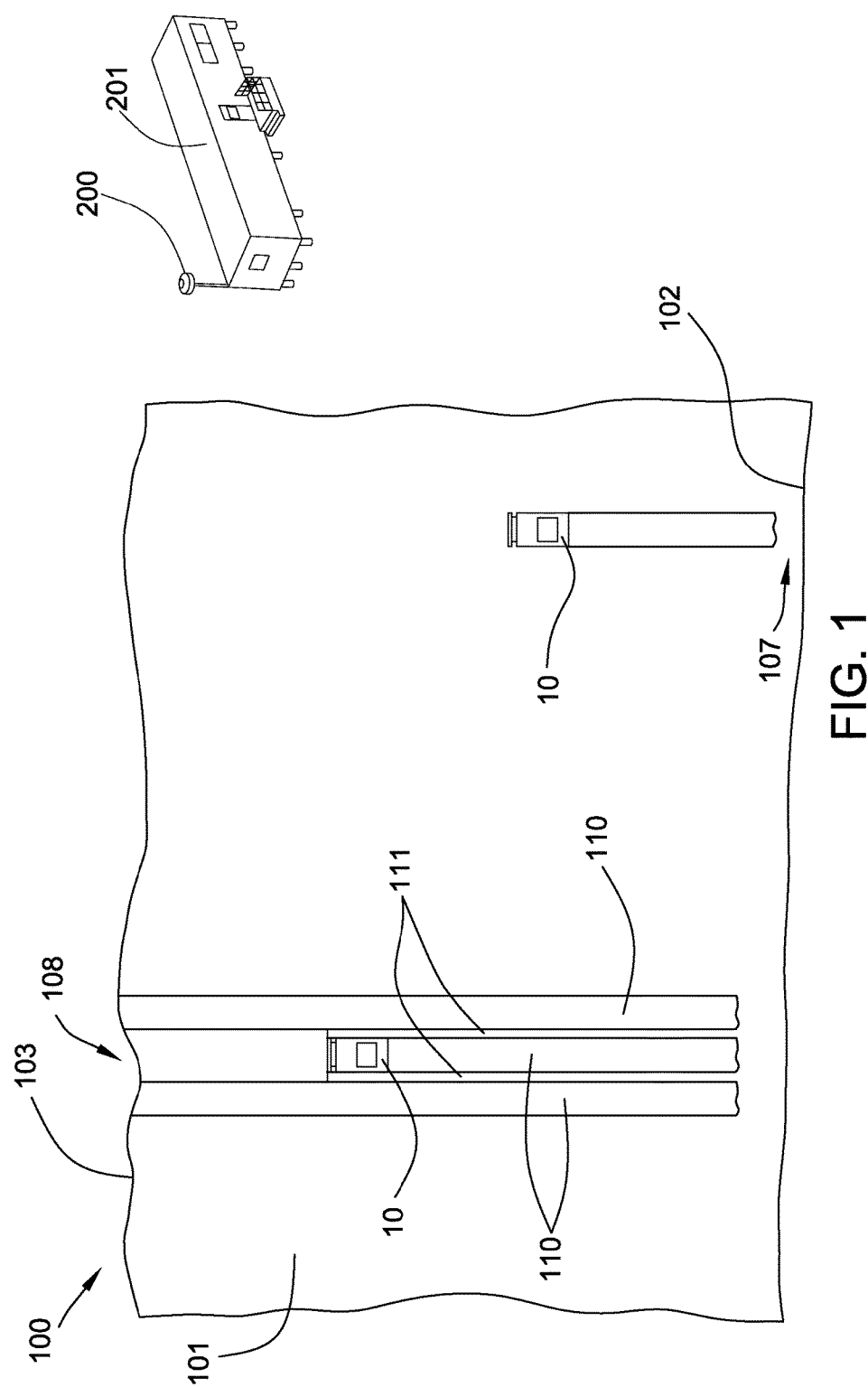
FIG. 1 depicts a schematic view of a work site at which a machine incorporating the principles disclosed herein may be used.

FIG. 1 depicts a diagrammatic illustration of a work site 100 at which one or more machines 10 may operate in an autonomous, a semi-autonomous, or a manual manner. Work site 100 may be a portion of a mining site, a landfill, a quarry, a construction site, or any other area in which movement of material is desired. Tasks associated with moving material may include a dozing operation, a grading operation, a leveling operation, a bulk material removal operation, or any other type of operation that results in the alteration of the existing topography at work site 100. As depicted, work site 100 includes a work area 101 having a high wall 102 at one end and a crest 103 such as an edge of a ridge, embankment, or other change in elevation at an opposite end. Material is moved generally from the high wall 102 towards the crest 103. The work surface 104 of the work area 101 may take any form and refers to the actual profile or position of the terrain of the work area.

As used herein, a machine 10 operating in an autonomous manner operates automatically based upon information received from various sensors without the need for human operator input. As an example, a haul or load truck that automatically follows a path from one location to another and dumps a load at an end point may be operating autonomously. A machine operating semi-autonomously includes an operator, either within the machine or remotely, who performs some tasks or provides some input and other tasks are performed automatically and may be based upon information received from various sensors. As an example, a load truck that automatically follows a path from one location to another but relies upon an operator command to dump a load may be operating semi-autonomously. In another example of a semi-autonomous operation, an operator may dump a bucket of an excavator in a load truck and a controller may automatically return the bucket to a position to perform another digging operation. A machine being operated manually is one in which an operator is controlling all or essentially all of the functions of the machine. A machine may be operated remotely by an operator (i.e., remote control) in either a manual or semi-autonomous manner.

Figure 2:
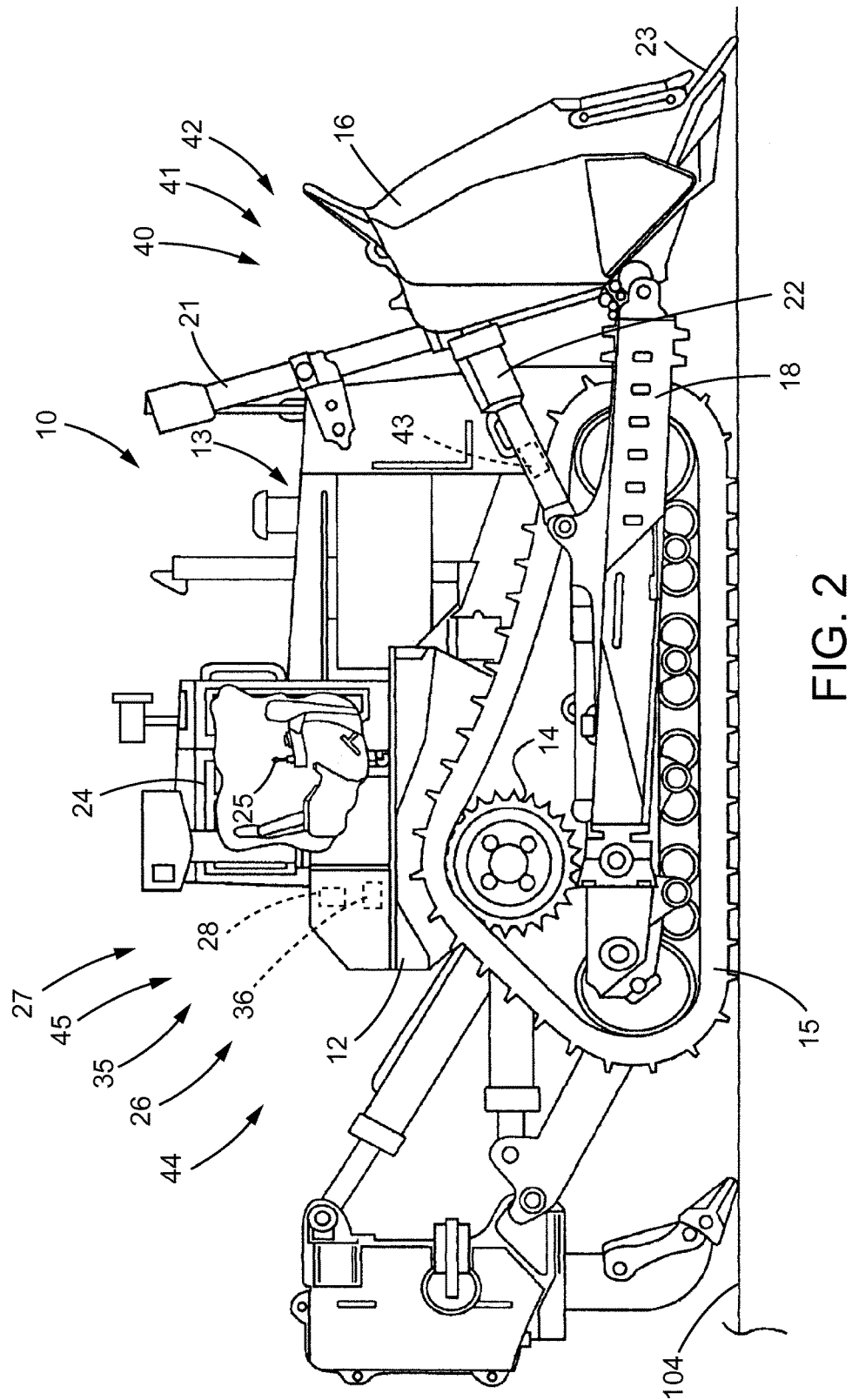
FIG. 2 depicts a diagrammatic illustration of a machine in accordance with the disclosure.

FIG. 2 depicts a diagrammatic illustration of a machine 10 such as a dozer with a ground-engaging work implement such as a blade 16 configured to push material. The machine 10 includes a frame 12 and a prime mover such as an engine 13. A ground-engaging drive mechanism such as a track 15 may be driven by a drive sprocket 14 on opposite sides of machine 10 to propel the machine. Although machine 10 is shown in a "track-type" configuration, other configurations, such as a wheeled configuration, may be used. Operation of the engine 13 and a transmission (not shown), which are operatively connected to the drive sprockets 14 and tracks 15, may be controlled by a control system 35 including a controller 36. The systems and methods of the disclosure may be used with any machine propulsion and drivetrain mechanisms applicable in the art for causing movement of the machine including hydrostatic, electric, or mechanical drives.

Blade 16 may be pivotally connected to frame 12 by arms 18 on each side of machine 10. First hydraulic cylinder 21 coupled to frame 12 supports blade 16 in the vertical direction and allows blade 16 to move up or down vertically from the point of view of FIG. 2. Second hydraulic cylinders 22 on each side of machine 10 allow the pitch angle of blade tip 23 to change relative to a centerline of the machine.

Machine 10 may include a cab 24 that an operator may physically occupy and provide input to control the machine. Cab 24 may include one or more input devices such as joystick 25 through which the operator may issue commands to control the propulsion system and steering system of the machine as well as operate various implements associated with the machine.

Machine 10 may be controlled by a control system 35 as shown generally by an arrow in FIG. 2 indicating association with the machine 10. The control system 35 may include an electronic control module or controller 36 and a plurality of sensors. The controller 36 may receive input signals from an operator operating the machine 10 from within cab 24 or off-board the machine through a wireless communications system 130 (FIG. 1). The controller 36 may control the operation of various aspects of the machine 10 including the drivetrain and the hydraulic systems.

The controller 36 may be an electronic controller that operates in a logical fashion to perform operations, execute control algorithms, store and retrieve data and other desired operations. The controller 36 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 36 such as power supply circuitry, signal conditioning circuitry, driver circuitry, and other types of circuitry.

The controller 36 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 36 may be implemented in hardware and/or software without regard to the functionality. The controller 36 may rely on one or more data maps relating to the operating conditions and the operating environment of the machine 10 and the work site 100 that may be stored in the memory of controller. Each of these data maps may include a collection of data in the form of tables, graphs, and/or equations.

The control system 35 and the controller 36 may be located on the machine 10 and may also include components located remotely from the machine such as at a command center 201 (FIG. 1). The functionality of control system 35 may be distributed so that certain functions are performed at machine 10 and other functions are performed remotely. In such case, the control system 35 may include a communications system such as wireless communications system 200 for transmitting signals between the machine 10 and a system located remote from the machine.

Machine 10 may be configured to be operated autonomously, semi-autonomously, or manually. When operating semi-autonomously or manually, the machine 10 may be operated by remote control and/or by an operator physically located within the cab 24.

Machine 10 may be equipped with a plurality of machine sensors 26, as shown generally by an arrow in FIG. 2 indicating association with the machine 10, that provide data indicative (directly or indirectly) of various operating parameters of the machine and/or the operating environment in which the machine is operating. The term "sensor" is meant to be used in its broadest sense to include one or more sensors and related components that may be associated with the machine 10 and that may cooperate to sense various functions, operations, and operating characteristics of the machine and/or aspects of the environment in which the machine is operating.

A position sensing system 27, as shown generally by an arrow in FIG. 2 indicating association with the machine 10, may include a position sensor 28, also shown generally by an arrow in FIG. 2 to indicate association with the machine, to sense the position and orientation (i.e., the heading, pitch, roll or tilt, and yaw) of the machine relative to the work site 100. The position and orientation of the machine 10 are sometimes collectively referred to as the position of the machine. The position sensor 28 may include a plurality of individual sensors that cooperate to generate and provide a plurality of position signals to controller 36 indicative of the position and orientation of the machine 10. In one example, the position sensor 28 may include one or more sensors that interact with a positioning system such as a global navigation satellite system or a global positioning system to operate as a position sensor. In another example, the position sensor 28 may further include a slope or inclination sensor such as pitch angle sensor for measuring the slope or inclination of the machine 10 relative to a ground or earth reference. The controller 36 may use position signals from the position sensors 28 to determine the position of the machine 10 within work site 100. In other examples, the position sensor 28 may include an odometer or another wheel rotation sensing sensor, a perception based system, or may use other systems such as lasers, sonar, or radar to determine all or some aspects of the position of machine 10.

In some embodiments, the position sensing system 27 may include a separate orientation sensing system. In other words, a position sensing system may be provided for determining the position of the machine 10 and a separate orientation sensing system may be provided for determining the orientation of the machine.

If desired, the position sensing system 27 may also be used to determine a ground speed of machine 10. Other sensors or a dedicated ground speed sensor may alternatively be used to determine the ground speed of the machine 10.

Machine 10 may be configured to move material at the work site 100 according to one or more material movement plans from an initial location 107 to a spread or dump location 108. The dump location 108 may be at crest 103 or at any other location. The material movement plans may include, among other things, forming a plurality of spaced apart channels or slots 110 that are cut into the work surface 104 at work site 100 along a path from the initial location 107 to the dump location 108. In doing so, each machine 10 may move back and forth along a linear path between the initial location 107 and the dump location 108. If desired, a relatively small amount of material may be left or built up as walls or berms 111 between adjacent slots 110 to prevent or reduce spillage and increase the efficiency of the material moving process. The berms 111 between the slots 110 may be removed after the slots are formed or periodically as discussed below. The process of moving material through slots 110 while utilizing berms 111 of material to increase the efficiency of the process is sometimes referred to as "slot dozing."

Figure 3:
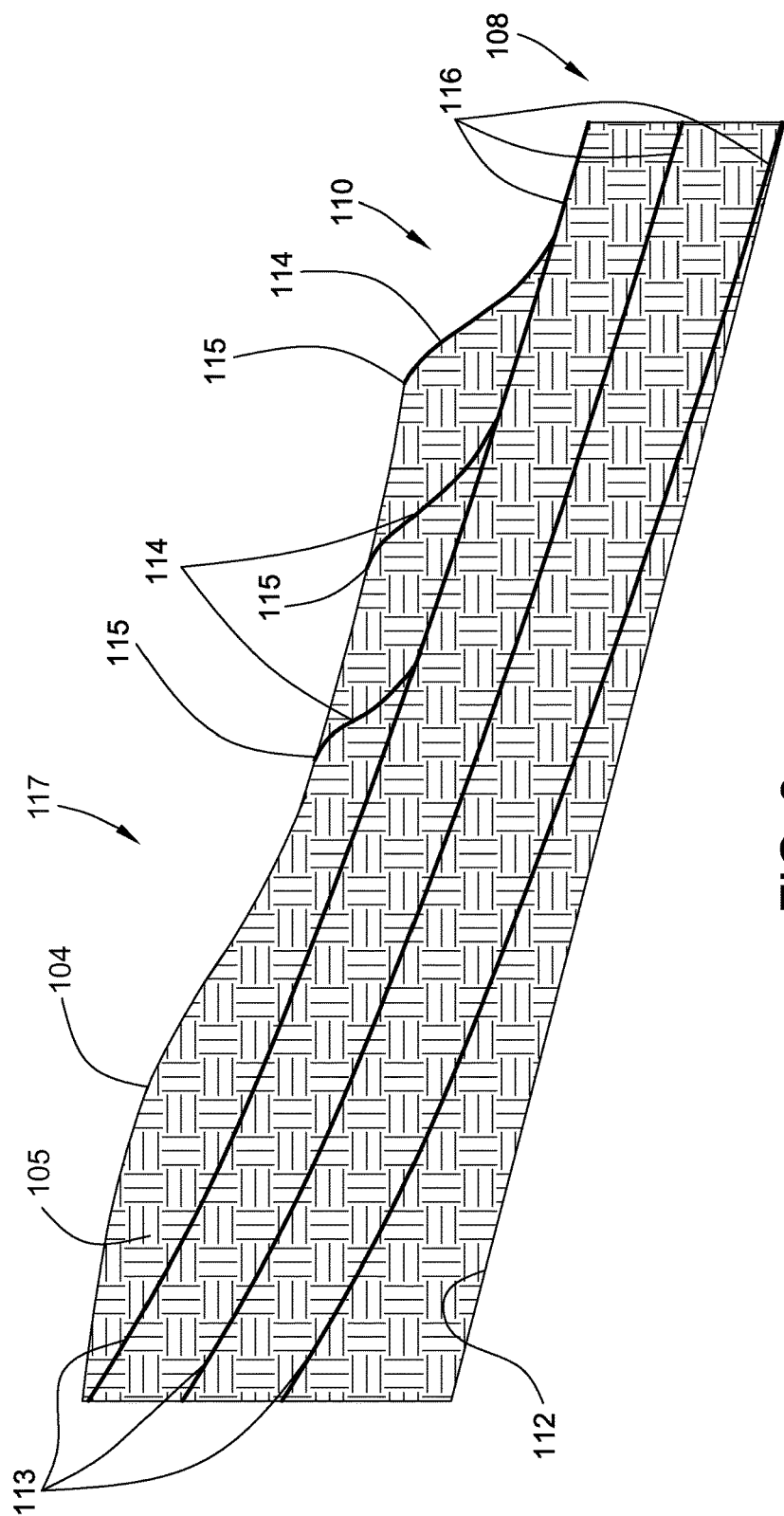
FIG. 3 depicts a cross-section of a portion of a work site depicting various aspects of a material moving plan.

As depicted in FIG. 3, in one embodiment, each slot 110 may be formed by removing material 105 from the work surface 104 in one or more layers or passes 113 until the final work surface or final design plane 112 is reached. The blade 16 of machine 10 may engage the work surface 104 with a series of cuts 114 that are spaced apart lengthwise along the slot 110. Each cut 114 begins at a cut location 115 along the work surface 104 at which the blade 16 engages the work surface and extends into the material 105 and moves towards the pass target or carry surface 116 for a particular pass. Controller 36 may be configured to guide the blade 16 along each cut 114 until reaching the carry surface 116 and then follow the carry surface towards the dump location 108.

Figure 4:
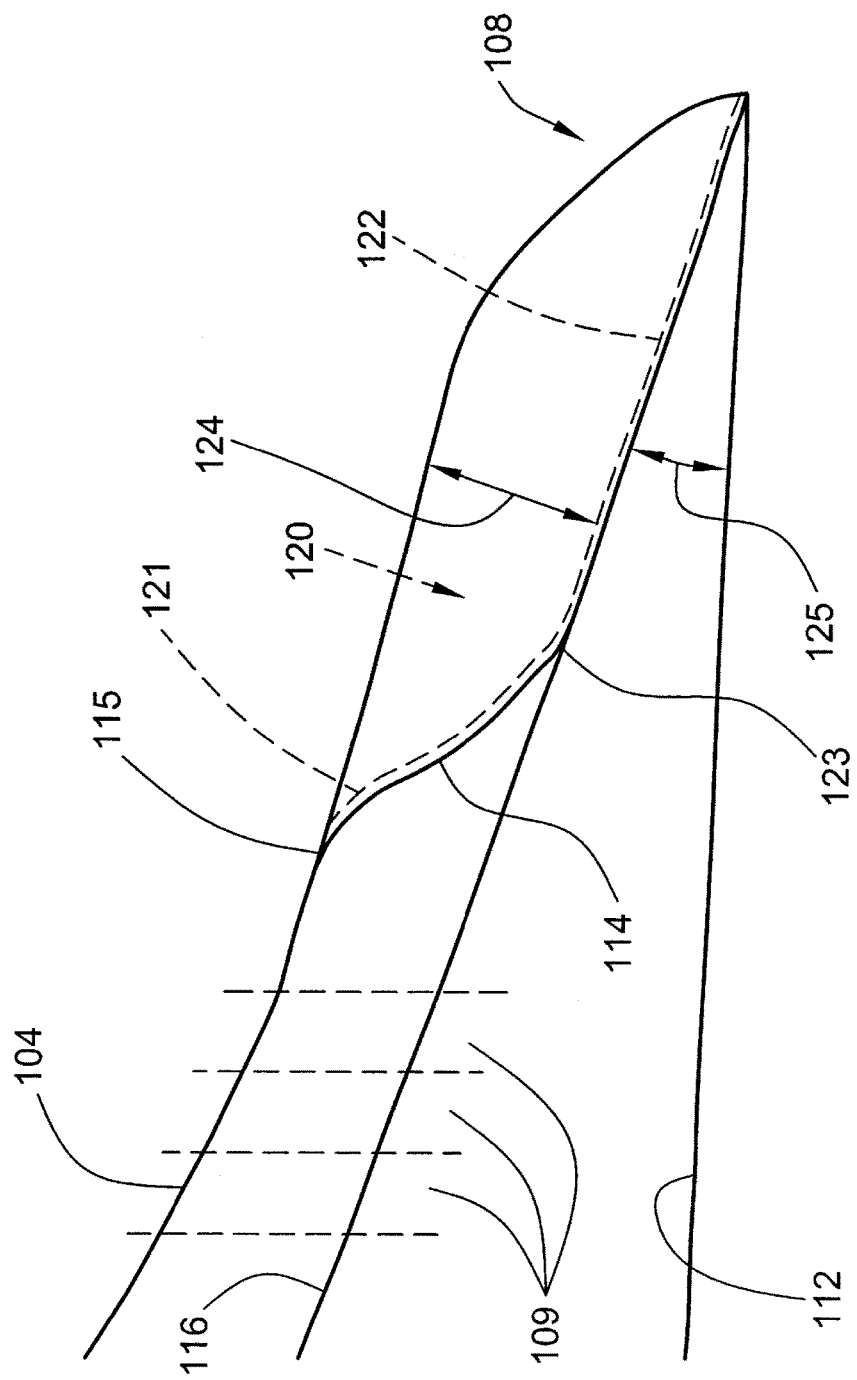
FIG. 4 depicts a diagrammatic cross-section of a portion of a work site depicting a potential target profile.

During each material moving pass, the controller 36 may guide the blade 16 generally along a desired path or target profile depicted by dashed line 120 in FIG. 4 from the cut location 115 to the dump location 108. A first portion of the target profile 120 extends from the cut location 115 to the carry surface 116. The first portion may be referred to as the loading profile 121 as that is the portion of the target profile 120 at which the blade 16 is initially loaded with material. A second portion of the target profile 120 extends from the intersection 123 of the cut 114 and the carry surface 116 to the dump location 108. The second portion may be referred to as the carry profile 122 as that is the portion of the target profile 120 at which the blade 16 carries the load along the carry surface 116.

The first portion or loading profile 121 may have any configuration and, depending on various factors including the configuration of the work surface 104 and the type of material to be moved, some cut profiles may be more efficient than others. The loading profile 121 may be formed of one or more segments that are equal or unequal in length and with each having different or identical shapes. These shapes may be linear, symmetrically or asymmetrically curved, Gaussian-shaped or any other desired shape. In addition, the angle of any of the shapes relative to the work surface 104 or the final design plane 112 may change from segment to segment.

The second portion or carry profile 122 may have any configuration but is often generally linear and sloped downward so that movement of material will be assisted by gravity to increase the efficiency of the material moving process. In other words, the carry profile 122 is often configured so that it slopes downward towards the dump location 108. The characteristics of the carry profile 122 (sometimes referred to as the slot parameters) may define the shape of the carry surface 116, the depth of the carry surface 116 below an uppermost surface of the work surface 104 as indicated by reference number 124, and the angle of the carry surface as indicated by reference number 125. In some instances, the angle 125 of the carry surface 116 may be defined relative to a gravity reference or relative to the final design plane 112.

Although it may be generally desirable for the blade 16 to follow the target profile 120, performance characteristics of the machine 10, characteristics of the material 105, and/or desired operating efficiencies may cause a deviation from the target profile 120. More specifically, as blade 16 makes a cut 114, the load on the blade will increase. Further, as the blade 16 travels along the carry surface 116, the load on the blade may continue to increase. If the blade 16 is overloaded for a particular slope, the machine 10 may slip and/or cause excess wear on the machine. Accordingly, the control system 35 may include a blade control system 40 to improve the efficiency of the material moving process.

In one embodiment, the blade control system 40 may control the load on the blade 16 so that the torque generated by the machine 10 is generally maintained at or about a predetermined value. In one example, it may be desirable to maintain the load on the machine 10 at approximately 80% of its maximum torque. In other examples, it may be desirable to maintain the load within a range of approximately 70-90% of the maximum torque. Other values and ranges are contemplated. In order to maintain the load at a desired value or within a desired range, the blade control system 40 may raise or lower the blade 16 to decrease or increase the amount of material carried by the blade 16 and thus decrease or increase the load.

The control system 35 may include an implement load monitoring system 41 shown generally by an arrow in FIG. 2. The implement load monitoring system 41 may include a variety of different types of implement load sensors depicted generally by an arrow in FIG. 2 as an implement load sensor system 42 to measure the load on the blade 16. In one embodiment, the implement load sensor system 42 may embody one or more pressure sensors 43 for use with one or more hydraulic cylinder, such as second hydraulic cylinders 22, associated with blade 16. Signals from the pressure sensor 43 indicative of the pressure within the second hydraulic cylinders 22 may be monitored by controller 36. Other ways of determining a change in cylinder pressure associated with a change in the load on blade 16 are contemplated, including other ways of measuring the pressure within second hydraulic cylinders 22 and measuring the pressure within other cylinders associated with the blade. The load on the blade 16 may be correlated to the load on the engine 13 by controller 36.

The load on the blade 16 may be affected by the slope of the terrain upon which the machine 10 is moving. Accordingly, if desired, the accuracy of the implement load measurement may be increased by utilizing the implement load sensor system 42 in conjunction with a slope or inclination sensor such as a pitch angle sensor. For example, if the machine 10 is moving uphill, the load on the blade 16 may be higher due to gravity as compared to a machine operating in the same conditions on flat terrain. Similarly, the load on the blade 16 may be lower for the same mass or volume when the machine in moving downhill. By determining the slope of the terrain, the controller 36 may more accurately determine changes in the load on the blade 16.

As used herein, the word "uphill" refers to a direction towards the high wall 102 relative to the crest 103 or dump location 108. Similarly, the word "downhill" refers to a direction towards the crest 103 or dump location 108 relative to the high wall 102.

If desired, control system 35 may also include a machine load monitoring system 44 that may be used by the blade control system 40. In one embodiment, the machine load monitoring system 44 may utilize an engine speed sensor (not shown) and a torque converter speed sensor (not shown) to measure a difference between the speed of the engine 13 and a torque converter (not shown) to determine the load on the machine 10.

Control system 35 may include a module or planning system 45 for determining or planning various aspects of the excavation plan. The planning system 45 may receive and store various types of input such as the configuration of the work surface 104, the final design plane 112, a desired loading profile 121, a desired carry profile 122, and characteristics of the material to be moved. Operating characteristics and capabilities of the machine 10 such as maximum load may also be entered into the planning system 45. The planning system 45 may simulate the results of cutting the work surface 104 at a particular cut location and for a particular target profile, and then choose a cut location that creates the most desirable results based on one or more criteria. In one embodiment, the planning function may be performed while operating the machine 10. In another embodiment, some or all aspects of the planning function may be performed ahead of time and the various inputs to the planning system 45 and the resultant cut locations, target profiles, and related data stored as part of the data maps of the controller 36.

Referring to FIGS. 3 and 4, a potential cut 114 at work site 100 that may be generated by control system 35 is illustrated. Work surface 104 represents the uppermost height of the existing material 105 at the slot 110. While the illustration is depicted in two dimensions, it should be appreciated that the data representing the illustration may be in three dimensions. In one example, the path 117 along slot 110 may be divided into a plurality of increments 109 (FIG. 4) and data stored within controller 36 for each increment. The controller 36 may store information or characteristics of the increment 109 such as the length of the work surface and its angular orientation relative to a ground reference, the material characteristics of the material 105 beneath the work surface, a time stamp or indicator of the age of the data, and any other desired information. The information regarding each path 117 may be stored within an electronic map within controller 36 as part of a topographical map of the work site 100.

Information regarding each path 117 may be obtained according to any desired method. In one example, the machine 10 may utilize the position sensing system 27 described above to map out the contour of work surface 104 as machine 10 moves across it. This data may also be obtained according to other methods such as by a vehicle that includes lasers and/or cameras. It should be noted that as the machine 10 moves material 105 to the dump location 108, the position of the work surface 104 will change and may be updated based upon the current position of the machine 10 and the position of the blade 16.

As may be seen in FIG. 4, moving the blade 16 along the target profile 120 will result in a volume of material 105 being moved from slot 110. The planning system 45 may use the shape of the loading profile 121 and the cut location 115 to determine the volume of material that would be moved by blade 16 if the machine 10 were to follow the target profile 120. More specifically, the planning system 45 may use three-dimensional data that represents the machine 10, the work surface 104, and the target profile 120 to make a volumetric calculation of the volume of material that will be moved for a particular target profile 120.

Planning system 45 may include a performance evaluation and feedback system 46 configured to evaluate and provide feedback with respect to the difference between an expected or target profile 120 and the actual profile or topography that results from a material moving cycle. The feedback may be used periodically to adjust the operation of the planning system 45 to improve the performance or efficiency of a material moving operation.

In one example, the performance evaluation and feedback system 46 may initially generate or assign a numerical value or score associated with an expected or ideal material moving cycle. The performance evaluation and feedback system 46 may compare the actual topography of the work surface 104 after the material moving cycle to the target profile to create an overall score that is reflective of the actual topography of the work surface 104 after the material moving cycle. To do so, the performance evaluation and feedback system 46 may evaluate the difference between the actual profile or topography and the target profile based upon a plurality of performance factors. A numerical or quantitative value may be assigned to each performance factor and the ideal score modified based upon the score associated with each performance factor. As a result, the numerical value of the ideal material moving cycle may be reduced based upon the actual performance as measured by comparing the target profile to the actual post-material moving cycle topography.

As stated above, planning system 45 may be configured to determine the details of a material moving process based upon various inputs including the topography of the work surface 104, the final design plane 112, one or more potential loading profiles 121, a desired carry profile 122, characteristics of the material to be moved, as well as operating characteristics and capabilities of the machine 10. The planning system 45 may evaluate a plurality of different cut locations as well as different loading profiles and ultimately select a cut location and loading profile. In doing so, the planning system 45 may evaluate various factors that are used to determine the desirability or the efficiency of each cut location and loading profile.

One factor that may be evaluated by the planning system 45 is the volume of material being moved during the material moving process. Additional factors may be directed to the efficiency of the material moving process during a specific material moving cycle such as the amount of fuel consumed. For example, selecting a cut location 115 at a location relatively close to the dump location 108 may be desirable to minimize the distance that the machine must carry the material 105 to the dump location.

Still other factors may be directed to the efficiency of subsequent material moving cycles. For example, it may be desirable for the cut and carry operations to move along a downward slope to use gravity to assist in moving the material since less force will be required to move the material downhill. It should be noted, however, that it may be desirable to avoid a slope that is so steep that the machine may not back up the slope in second gear. In addition, certain cut locations 115 and/or loading profiles 121 may result in an undesirable topography of the work surface 104 such as leftover bumps and surface roughness that require correction by subsequent material moving operations. In addition, each time a machine 10 moves along the work surface 104, it compacts the work surface. Accordingly, selecting a cut location 115 too far from the dump location 108 may cause the machine 10 to travel increased distances over the work surface 104 and unnecessarily compact the work surface, thus requiring additional energy to subsequently move the material 105 to the dump location.

In other words, the planning system 45 may be configured to not only evaluate potential cut locations 115 and loading profiles 121 to determine their impact on an initial material moving cycle, but also subsequent material moving cycles. For example, referring to FIG. 5, a path 117 is depicted with the work surface 104 extending above the desired carry surface 116. A first cut location is depicted at 130 and a second cut location is depicted at 135. Referring to FIG. 6, a new work surface 131 is depicted after a material moving cycle beginning at the first cut location 130 with the amount of material moved indicated by the shading 132 extending between the new work surface 131 and the original or previous work surface 104. In this example, the amount of material moved is 100% of the desired amount and approximately 80% of the capacity of the machine 10.

Referring to FIG. 7, a new work surface 136 is depicted after a material moving cycle beginning at the second cut location 135 with the amount of material moved indicated by the shading 137 extending between the new work surface 136 and the original or previous work surface 104. In this example, the amount of material moved is 120% of the desired amount and approximately 100% of the capacity of the machine 10. Since the machine was operating at 100% of its capacity, it could not move all of the material and thus the blade control system 40 raised the blade 16 leaving a bump 138. As the machine 10 moves along the path 117, it must climb over the bump 138 which wastes fuel and compacts the work surface 104.

FIG. 8 depicts a subsequent work surface 140 after performing a cut at a subsequent cut location 141 in FIG. 7 and FIG. 9 depicts the next sequential work surface 142 after performing a cut at the next cut location 143 in FIG. 8. Since more energy is required for the machine 10 to climb uphill, such as over bump 138, the blade control system 40 may cause machine 10 to lose or deposit material 105 at the bump 138 during each subsequent material moving cycle and thus cause the bump to increase in size with each cycle. In additional to the extra energy required to travel over the bump 138, a separate process may eventually be necessary to remove the bump. Accordingly, even though the second cut location 135 initially resulted in more material being moved, the planning system 45 may specify the use of the first cut location 130 as it results in an overall more efficient material moving operation.

The performance evaluation and feedback system 46 may generate and assign a numerical value (i.e., an ideal score) to an ideal material moving cycle that follows the target profile 120 based upon the desired cut location 115 and desired loading profile 121. In other words, either in conjunction with or subsequent to the selection of the desired cut location 115 in desired loading profile 121, the performance evaluation and feedback system 46 may assign a numerical value or ideal score for use with the evaluation of each material moving cycle. For example, for the material moving cycle beginning at first cut location 130 (FIG. 5), the performance evaluation and feedback system 46 may assign an ideal score such as "95" on a scale of 100. If, for some reason, the planning system 45 had selected the material moving cycle beginning at second cut location 135, the performance evaluation and feedback system 46 may have assigned an ideal score such as "70."

Once the desired cut location 115 and desired loading profile 121 have been selected, the controller 36 may generate instructions to move machine 10 along path 117 to carry out a material moving cycle. After or while the machine 10 moves along path 117 during the material moving cycle, the controller 36 may determine the position or topography of the newly generated work surface 104. In one embodiment, the controller 36 may utilize position signals from the position sensor 28 as the machine is moving material to determine the position of the work surface 104. In another embodiment, the controller 36 may process the position signals as the machine moves in reverse along path 117 to position the machine to perform additional material moving cycles. In still another embodiment, or another system or machine may be used to determine the position of the work surface 104 during or after the material moving process.

The performance evaluation and feedback system 46 may operate by evaluating various performance factors, assigning a score to each performance factor, and subtracting the scores from the numerical value or ideal score assigned to the ideal material moving cycle. A first performance factor may be the volume of material moved. More specifically, the performance evaluation and feedback system 46 may evaluate the actual amount of material moved and compare it to the target amount of material expected to be moved.

Figure 10:
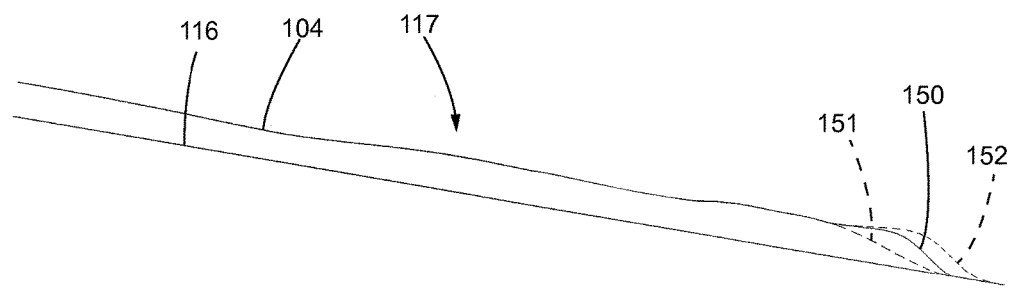
FIG. 10 depicts a cross-section of a portion of a work site illustrating different volumes of material moved.

For example, referring to FIG. 10, the ideal or target work surface after performing the ideal material moving cycle is depicted at 150. If the actual work surface exactly matched the target work surface 150, the difference would be zero. If the actual cut location were uphill as depicted in FIG. 10 at 151, a greater amount or volume of material has been moved. If the actual cut location were downhill as depicted at 152, a smaller amount or volume of material has been moved.

Based upon the difference between the actual volume of material moved and the expected or target value of material, a volume performance factor score may be generated. In one example, the volume performance factor score may be proportional to the difference between the target volume of material and the actual amount of material moved. In another example, a volume performance factor score may not be generated (i.e., may be set to zero) if the actual volume of material moved is within a predetermined threshold of the target volume of material. Further, if the actual volume of material moved varies from the target or goal by more than a second threshold, the performance evaluation and feedback system 46 may generate a "fail" signal rather than generate a volume performance factor score to be used to modify the ideal score to determine the overall score for the target profile.

In general, a relatively small increase in material being moved over the target quality may be acceptable provided that the machine 10 may continue to follow the target profile 120. For example, see cut location 151 in FIG. 10. However, FIGS. 7-9 depict an instance in which the machine 10 was attempting to move too much material and thus was unable to follow the target profile 120. Referring back to FIG. 10, cut location 152 depicts an instance in which the machine will likely follow the target profile 120 but the efficiency of the material moving cycle will be decreased due to the relatively small load.

Figure 11:
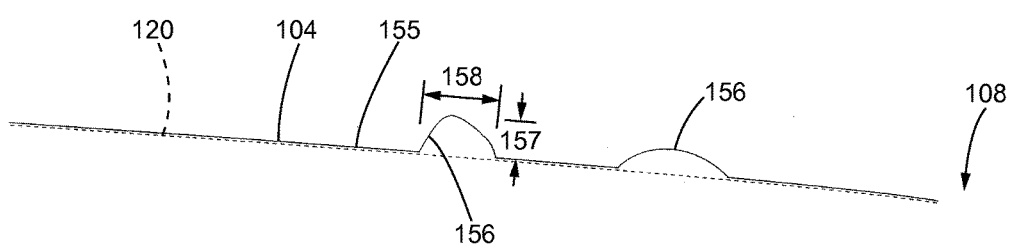
FIG. 11 depicts a cross-section of a portion of a work site illustrating a pair of non-ignorable bumps.

A second performance factor may be whether there are any relatively large or "non-ignorable" bumps remaining on the work surface 104 above the target profile 120 after a material moving cycle. A non-ignorable bump may be considered a bump that is taller than a height threshold and longer (i.e., in the direction of travel of the machine 10) than a length threshold. Referring to FIG. 11, the target profile 120 is depicted as a dashed line and the actual profile or work surface is depicted at 155 with a pair of non-ignorable bumps 156. The height is depicted at 157 and the length is depicted at 158. It should be noted that bumps that do not meet the height and length thresholds may be ignored (except as described below) because they will be small enough so as not to significantly impact the performance of the material moving process. In one example, the bump performance factor score may be generated based upon the height of the tallest non-ignorable bump. In another example, the bump performance factor score may be generated based upon the total height of all of the non-ignorable bumps. Bumps that do not qualify as non-ignorable may be analyzed as discussed below with respect to the roughness of the work surface.

Figure 12:
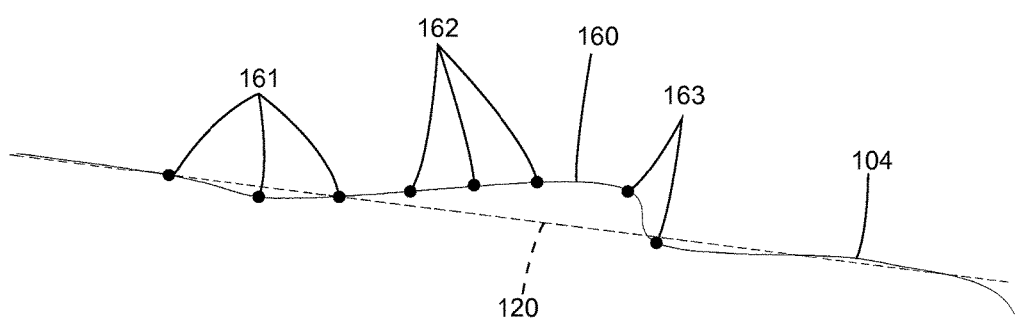
FIG. 12 depicts a cross-section of a portion of a work site illustrating the curvature and slope of the work surface.

A third performance factor may be based upon the curvature of the work surface 104 after a material moving cycle has been completed. In general, a work surface 104 having relatively sharp curves may be undesirable as the machine 10 may not be able to follow a relatively sharp curve. To measure the curvature of the work surface 104, three points along the work surface may be chosen with the middle point equidistant between the outer two points. Referring to FIG. 12, a first set of three points 161 is depicted along an area of the work surface with a valley. A second set of three points 162 is depicted along a hill but the points are generally along a straight line.

The distance between the points may be selected based upon the size and capabilities of the machine 10 being operated. For example, a greater distance between points may be used with larger machines while a shorter distance between points may be used for smaller machines. The distance between points may be a multiple of the increments 109 (FIG. 4) that are used to define the topography of the work surface 104. By way of example only, for an extremely large machine 10, the distance between each pair of points may be equal to ten increments 109.

A curve or portion of a circle may be fitted to each set of three points and the radius determined. The inverse of the radius may be utilized to generate a curvature performance factor score. In one example the curvature performance factor score may be proportional to the difference between the target curvature and the actual curvature. In another example, a curvature performance factor score may be generated only if the curvature exceeds the curvature threshold. In still another example, the curvature performance factor score may be generated only if the difference between the target curvature and the actual curvature exceeds a second threshold. It should be noted that the curvature performance factor score may increase as the inverse of the radius increases (i.e., the radius is relatively small and thus requires the machine 10 to turn in a relatively sharp manner).

A fourth performance factor may be based upon the slope along the work surface 104 after a material moving cycle has been completed. In general, a work surface having relatively steep slopes may be undesirable as the machine 10 may be incapable of traversing a steep slope and/or travel along the steep slope may be dangerous. Measurement of the slope of the work surface 104 may be similar to the measurement of the curvature as described above except that rather than identifying three points along the work surface 104, only two points are utilized to determine the slope of the work surface. In FIG. 12, a pair of points 163 is depicted along a steep slope.

As with the curvature measurement, the distance between the points may be selected based upon the size of the machine 10 being operated, with the distance between points generally being larger for larger machines. To determine the slope of the work surface 104 between two points 163, the difference in the height of the points relative to a reference (e.g., sea level) may be divided by the distance between the points.

In one example, the slope performance factor score may be proportional to the difference between the target slope and the actual slope. In another example, the slope performance factor score may be generated only if the actual slope exceeds a first threshold. In still another example, the slope performance factor score may be generated only if the difference between the target slope and the actual slope exceeds a second threshold.

A fifth performance factor may be the roughness of the work surface 165 based upon undulations or bumps along the work surface that are smaller than the non-ignorable bumps 156. In general, undulations or small bumps 166 (FIG. 13) are undesirable because they require additional fuel to travel up and down each bump and thus waste energy. Further, to the extent that the bumps are uneven or inconsistent, the load on the blade 16 may vary and thus the machine 10 may be more likely to travel away from the desired path. In one example, the roughness of the work surface 165 may be determined using the International Roughness Index such as that identified in ASTM E1926—08. In an alternate embodiment, the roughness of the work surface 165 may be determined by calculating the average distance of each undulation or bump 166 from the target profile. In other words, the distance of the peak of each bump (positive or negative) may be measured and the absolute value of the distances added together and divided by the total number of bumps.

In one example, the roughness performance factor score may be proportional to the average height of the bumps. In another example, the roughness performance factor score may be generated only if the actual roughness exceeds a first threshold. In still another example, the roughness performance factor score may be generated only if the difference between the target roughness and the actual roughness exceeds a second threshold. As may be understood, the roughness performance factor score may thus increase as the average height of the bumps increases.

Figure 13:
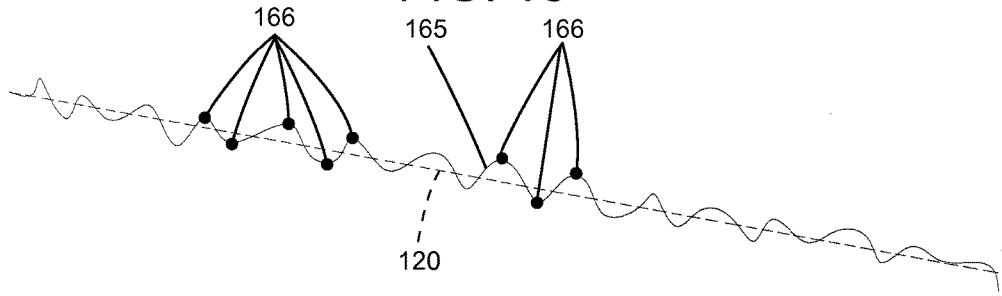
FIG. 13 depicts a cross-section of a portion of a work site illustrating undulations or bumps along the work surface.

A sixth performance factor measuring the minimum square error of bumps 166 may be utilized in addition to or instead of the roughness of the work surface 104. It may be desirable to determine the minimum square error of the bumps 166 as such calculation may assist in further defining the characteristics of the work surface 104. In particular, the calculation may assist in distinguishing a work surface 104 that has relatively large bumps that are smaller than the non-ignorable bumps 156 from a work surface that only has many undulations or small bumps 166 as depicted in FIG. 13.

To determine the minimum square error, the distance of the peak of each bump from the target profile may be measured and then the distance squared. The squares of the distances are added together and divided by the total number of bumps.

In one example, the minimum square error performance factor score may be based upon the calculated minimum square error for the bumps. In another example, the minimum square error performance factor score may be generated only if the actual minimum square error exceeds a first threshold. In still another example, the minimum square error performance factor score may be generated only if the difference between the target minimum square error and the actual minimum square error exceeds a second threshold. The minimum square error performance factor score will typically increase as the height of the highest bumps increase.

Once the performance factor scores have been determined, each may be multiplied by a weighting factor and subtracted from the ideal score to generate an overall score for the particular material moving cycle. One manner of expressing the performance factors is that they are costs to be subtracted from the ideal score so that the higher the overall score, the closer that the actual profile or topography matches the target profile. It should be noted that the volume performance factor may be positive or negative so that the volume performance factor may add to the ideal score (i.e., subtracting a negative number) in instances in which the volume of material moved exceeds the target volume.

The overall score for a material moving cycle may be expressed as:

$$\text{Score}_{overall} = \text{Score}_{ideal} - PF_{vol}WF_{vol} - PF_{bumps}WF_{bumps} - PF_{curv}WF_{curv} - PF_{slope}WF_{slope} - PF_{rough}WF_{rough} - PF_{mse}WF_{mse} \quad (1)$$

where $\text{Score}_{overall}$ is the overall score for the actual material moving cycle;
$\text{Score}_{ideal}$ is the score that would be generated if the actual profile after a material moving cycle exactly matches the target profile;
$PF_{vol}$ is the volume performance factor score indicative of the volume of material moved relative to the target volume of material;
$WF_{vol}$ is the weighting factor associated with the volume performance factor;
$PF_{bumps}$ is the bump performance factor score indicative of the non-ignorable bumps remaining along the actual profile;
$WF_{bumps}$ is the weighting factor associated with the non-ignorable bump performance factor;
$PF_{curv}$ is the curvature performance factor score indicative of any curvature remaining along the actual profile;
$WF_{curv}$ is the weighting factor associated with the curvature performance factor;
$PF_{slope}$ is the slope performance factor score indicative of any slopes along the actual profile;
$WF_{slope}$ is the weighting factor associated with the slope performance factor;
$PF_{rough}$ is the roughness performance factor score indicative of the roughness of the actual profile;
$WF_{rough}$ is the minimum square error weighting factor associated with the roughness performance factor;
$PF_{mse}$ is the performance factor score indicative of the minimum square error of the actual profile; and
$WF_{mse}$ is the weighting factor associated with the minimum square error performance factor.

The overall score for a target profile thus provides a quantitative evaluation or measure of the target profile relative to the actual profile generated by a material movement cycle. The planning system 45 may use the overall score as feedback to modify the planning process used to generate subsequent target profiles. More specifically, the planning system 45 may modify a subsequent cut location 115, the aggressiveness or angle of a subsequent loading profile 121 relative to the work surface, or any other aspect of a target profile based upon the overall score.

Figure 14:
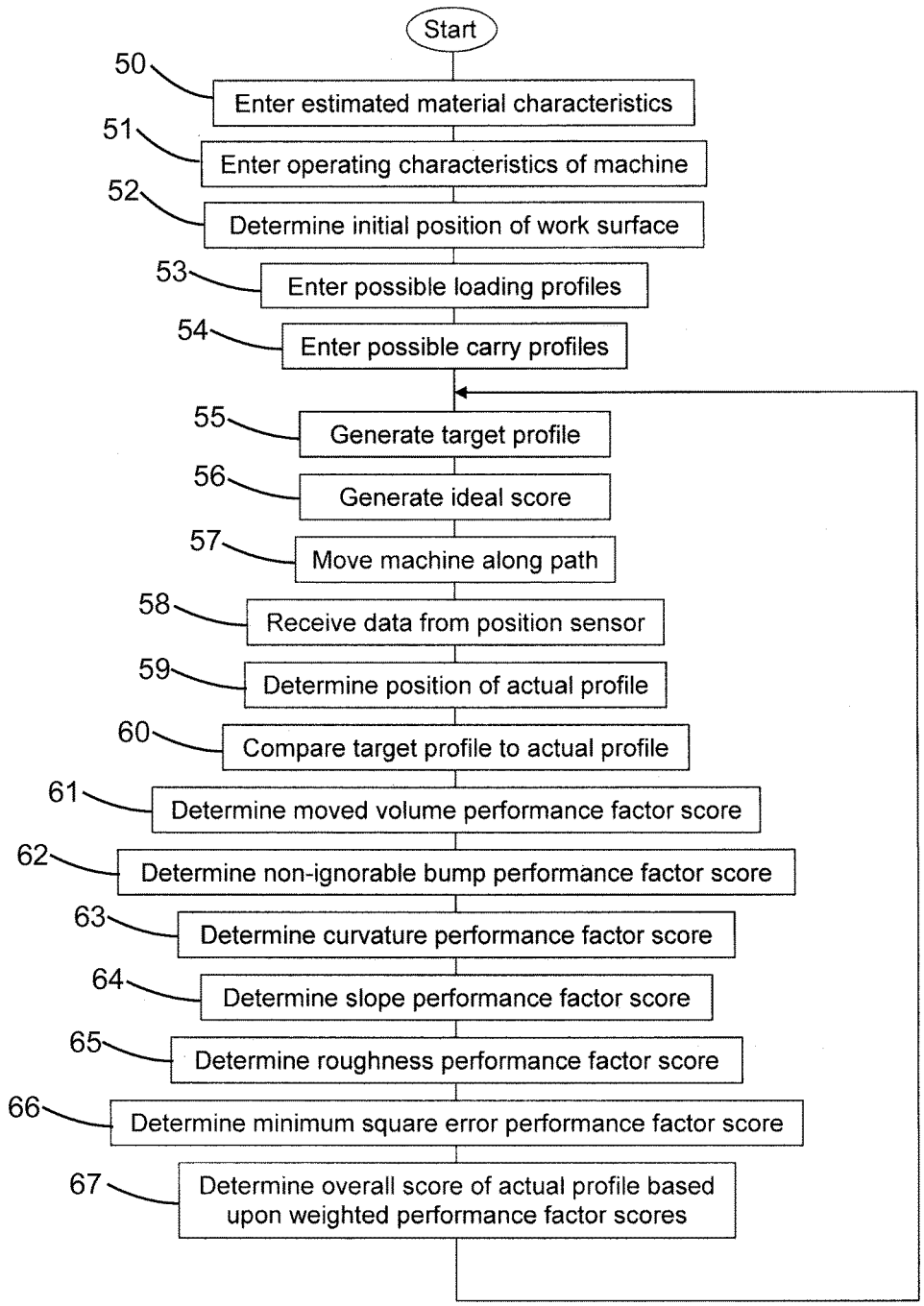
FIG. 14 depicts a flowchart illustrating the processes of target profile planning and performance evaluation and feedback in accordance with the disclosure.

Referring to FIG. 14, a flowchart is depicted of the process for generating target profiles and providing feedback through the performance evaluation and feedback system 46 to improve the performance or efficiency of the material moving process. At stage 50, characteristics of the material to be moved may be entered into controller 36. The characteristics may include, for example, the density, liquid content, viscosity, and/or the consistency of the material. At stage 51, the operating characteristics of machine 10 may be entered into controller 36. The characteristics may include a desired maximum load that may be used by the blade control system 40 as well as setting a maximum slope that the machine 10 may climb or descend. Various dimensions of the machine 10 may also be entered into controller 36 such as the dimensions of the blade 16, which may be used by the controller to determine the volume of material moved by the machine.

The initial position or topography of the work surface 104 may be determined at stage 52. The topography of the work surface 104 may be determined in any desired manner including by moving a mapping vehicle (not shown) along the work surface to establish its configuration. In an alternate step, machine 10 may be moved along the work surface 104 and the position sensor 28 may provide position signals to the controller 36 to indicate the position of the machine. The controller 36 may determine the position of the machine 10 within the work site 101 as well as the orientation of the machine such as its heading, pitch, and roll. Based upon the known dimensions of the machine 10 stored within the controller 36 and a datum or reference point on the machine relative to the position sensor 28, the controller may determine the configuration of the work surface 104 over which the machine is traveling.

At stage 53, a plurality of possible loading profiles may be stored within controller 36. The loading profiles may include combinations of different shapes (e.g., Gaussian, etc.) and different angles or levels of aggressiveness. A plurality of possible carry profiles may be stored within controller 36 at stage 54. The carry profiles may have different angles relative to a ground reference and may have other differences, if desired. The planning system 45 may determine at stage 55 a target profile 120 based upon various factors including the topography or profile of the work surface 104, operating characteristics of the machine 10, and the characteristics of the material to be moved. The target profile 120 may include the desired cut location 115, the desired loading profile 121, and the desired carry profile 122.

The performance evaluation and feedback system 46 may generate at stage 56 an ideal score or numerical value assigned to the target profile 120 generated by the planning system 45. The ideal score corresponds to a relative value based upon the efficiency of the current material moving cycle as well as the potential impact of the material moving cycle on subsequent material moving cycles.

At stage 57, the machine 10 is moved along the path 117 from the cut location 115 to the dump location 108. As the machine 10 moves along the path 117, the controller 36 may receive at stage 58 data such as position signals from the position sensor 28. Inasmuch as the position sensor 28 may not be positioned immediately adjacent the work surface 104, the controller 36 may utilize the known dimensions of the machine 10 together with the data from the position sensor 28 to determine at stage 59 the configuration of the actual profile of work surface 104. Other manners of determining the configuration of the actual profile are contemplated.

The controller 36 may compare at stage 60 the target or expected profile to the actual profile or topography of work surface 104 measured during or after the machine 10 is moved from the cut location 115 to the dump location 108. Based upon the differences between the expected profile and the actual profile of the work surface 104, the performance evaluation and feedback system 46 may determine one or more performance factor scores to quantify the differences and provide feedback to the planning system 45 to improve the performance of subsequent material moving cycles.

At stage 61, the controller 36 may determine the actual amount of material moved during the material moving cycle and compare the actual amount to the target or expected amount of material moved. Based upon the difference, a volume performance factor score may be generated. In one example, if the volume of material moved is greater than the expected volume but less than a maximum volume threshold, the volume performance factor score may increase the overall score for a material moving cycle. At stage 62, the controller 36 may determine whether any non-ignorable bumps 156 exist on the work surface 104. The controller 36 may use the dimensions of one or more non-ignorable bumps 156 to determine the bump performance factor score.

At stage 63, the controller 36 may analyze the curvature of the work surface 104 and use the curvature to determine a curvature performance factor score. The controller 36 may analyze at stage 64 the slope of the work surface 104 and use the slope to determine a slope performance factor score. At stage 65, the controller 36 may analyze bumps 166 that are smaller than the non-ignorable bumps 156 and determine a roughness performance factor score. At stage 66, the controller 36 may analyze bumps 166 and determine a minimum square error performance factor score.

The controller 36 may determine at stage 67 an overall score for the target profile 120 of the work surface 104. To do so, the controller 36 may multiply each performance factor score by an associated scaling or weighting factor and subtract the product of the performance factor score and the weighting factor from the ideal score. As stated above, if the volume of material moved is greater than the target volume but less than a maximum volume threshold, the product of the volume performance factor score and the volume weighting factor may increase the overall score of the target profile.

The overall score for the target profile based upon a material moving cycle may be provided to the planning system 45 as feedback to improve the operation and/or efficiency of the planning system. For example, the planning system 45 may adjust the shape and/or slope or aggressiveness of subsequent loading profiles 121 to attempt to improve the material moving process. As the overall score for each material moving cycle increases, the material movement process is following the target profile 120 more closely and thus should increase the efficiency of the process.

Although depicted using six performance factors, the performance evaluation and feedback system 46 may utilize any number and combination of performance factors to perform a quantitative analysis. In addition, the performance evaluation and feedback system 46 may utilize any desired weighting factors. In one example, the weighting factors may be set so that each performance factor has an equal impact on the overall score. In another example, the weighting factors may be set so that one or more of the performance factors has a greater impact on the overall score as compared to other performance factors.

In addition, although the performance evaluation and feedback system 46 is depicted with the analysis setting an ideal score for the target profile (e.g., stage 56 in FIG. 14), it may be possible to operate the system without an ideal score by evaluating the weighted performance factor scores. For example, example, the weighted performance factor scores may be added together with a lower total score indicative of a more efficient or accurate target profile as compared to a higher total score.

Industrial Applicability

The industrial applicability of the control system 35 described herein will be readily appreciated from the forgoing discussion. The foregoing discussion is applicable to systems in which one or more machines 10 are operated autonomously, semi-autonomously, or manually at a work site 100. Such system may be used at a mining site, a landfill, a quarry, a construction site, a roadwork site, a forest, a farm, or any other area in which movement of material is desired.

The performance evaluation and feedback system 46 may be used with any material moving planning system to provide a quantitative analysis of how well the planning system 45 is generating target profiles 120 that may be followed by a machine 10. To do so, the performance evaluation and feedback system 46 may compare the actual topography or profile of the work surface 104 after a material moving cycle to a target profile 120. Differences between the topography and the target profile 120 may be compared to one or more performance factors to generate a quantitative analysis in the form of one or more performance factor scores. If desired, the performance factors scores may be analyzed relative to an ideal score assigned to the target profile 120 to evaluate the planning process used to generate the target profile. In addition, the planning system 45 may modify future loading profiles and/or target profiles based upon the quantitative analysis.

It will be appreciated that the foregoing description provides examples of the disclosed system and technique. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for adjusting a target profile of a work implement, the target profile being used to move material along a path, comprising:
   a position sensor for generating position signals indicative, of a position of a work surface; and
   a controller configured to:
      utilize a planning system to determine a first target profile, the first target profile including a first loading profile and a first carry profile;
      autonomously control the work implement along the path based upon the first target profile to move a first volume of material;
      receive position signals from the position sensor;
      determine from the position signals an actual profile indicative of the work surface after the work implement is moved along the path to move the first volume of material;
      compare the first target profile to the actual profile;
      determine at least two performance factor scores based upon a difference between the first target profile and the actual profile;
      generate weighted performance factor scores from the at least two performance factor scores;
      generate a quantitative evaluation of the first target profile based upon the weighted performance factor scores;
      utilize the planning system to determine a second target profile, the second target profile including a second loading profile and a second carry profile, the second target profile being based upon the quantitative evaluation and an adjustment to at least one of the first loading profile and the first carry profile; and
      autonomously control the work implement along the path based upon the second target profile to move a second volume of material.

2. The system of claim 1, wherein the at least two performance factor scores include a volume performance factor score.

3. The system of claim 2, wherein the at least two performance factor scores include a non-ignorable bump performance factor score.

4. The system of claim 3, further including at least one of a curvature performance factor score and a slope performance factor score.

5. The system of claim 3, further including at least one of a roughness performance factor score and a minimum square error performance factor score.

6. The system of claim 1, wherein the at least two performance factor scores include a non-ignorable bump performance factor score.

7. The system of claim 1, wherein the controller is configured to store a threshold and generate a fail signal upon exceeding the threshold.

8. The system of claim 7, wherein the threshold is directed to a performance factor that is not used to generate the quantitative evaluation.

9. The system of claim 1, wherein the controller is further configured to generate an ideal score for the target profile and determine an overall score for the actual profile based upon the ideal score and the weighted performance factor scores.

10. The system of claim 9, wherein the controller is further configured to subtract at least one of the weighted performance factor scores from the ideal score.

11. The system of claim 1, wherein the controller is farther configured to adjust an angle of a subsequent loading profile relative to the work surface based upon the quantitative evaluation.

12. The system of claim 1, wherein the controller is further configured to adjust an angle of a subsequent target profile relative to the work surface based upon operating characteristics of the machine.

13. The system of claim 12, wherein the controller is further configured to adjust an angle of a subsequent target profile relative to the work surface based upon material characteristics of the material.

14. The system of claim 1, wherein the position sensor is on the machine and the controller is further configured to receive the position signals as the machine moves along the path.

15. A controller implemented method for adjusting a target profile of a work implement to move material along a path, comprising:
   utilizing a planning system to determine a first target profile, the first target profile including a first loading profile and a first carry profile;
   autonomously controlling the work implement along the path based upon the first target profile to move a first volume of material;
   receiving position signals from a position sensor, the position signals being indicative of a position of a work surface;

determining from the position signals an actual profile indicative of the work surface after the work implement is moved along the path to move the first volume of material;

comparing the first target profile to the actual profile;

determining at least two performance factor scores based upon a difference between the first target profile and the actual profile;

generating weighted performance factor scores from the at least two performance factor scores;

generating a quantitative evaluation of the first target profile based upon the at least two performance factor scores;

utilizing the planning system to determine a second target profile, the second target profile including a second loading profile and a second carry profile, the second target profile being based upon the quantitative evaluation and an adjustment to at least one of the first loading profile and the first carry profile; and autonomously controlling the work implement along the path based upon the second target profile to move a second volume of material.

16. The method of claim 15, Wherein the at least two performance factor scores include a volume performance factor score.

17. The method of claim 15, wherein the at least two performance factor scores include a non-ignorable bump performance factor score.

18. The method of claim 15, further including generating an ideal score for the target profile and determining an overall score for the actual profile based upon the ideal score and the weighted performance factor scores.

19. The method of claim 15, further including adjusting an angle of a subsequent loading profile relative to the work surface based upon the quantitative evaluation.

20. A machine comprising:
a prime mover, a work implement for engaging a work surface and moving a volume of material along a path;
a position sensor for generating position signals indicative of a position of the work surface; and
a controller configured to:
utilize a planning system to determine a first target profile for moving material along the path, the first target profile including a first loading profile and a first carry profile;
autonomously control the work implement along the path based upon the first target profile to move a first volume of material;
receive position signals from the position sensor;
determine from the position signals an actual profile indicative of the work surface after the work implement is moved along the path to move the first volume of material;
compare the first target profile to the actual profile;
determine at least two performance factor scores based upon a difference between the first target profile and the actual profile;
generate weighted performance factor scores from the at least two performance factor scores;
generate a quantitative evaluation of the first target profile based upon the weighted performance factor scores;
utilize the planning system to determine a second target profile, the second target profile including a second loading profile and a second carry profile, the second target profile being based upon the quantitative evaluation and an adjustment to at least one of the first loading profile and the first carry profile; and
autonomously control the work implement along the path based upon the second target profile to move a second volume of material.

* * * * *